Stroop & Esteale.
Cage Trap.
Nº 3326.    Patented Nov. 6, 1843.
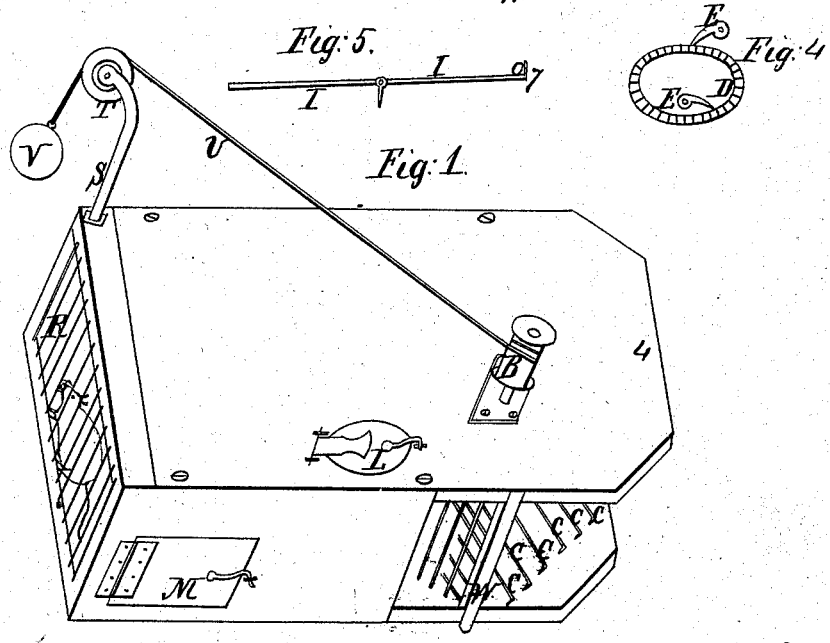

UNITED STATES PATENT OFFICE.

JACOB STROOP AND JOHN ESTEALE, OF ALLEGHENY, PENNSYLVANIA.

BOX-TRAP FOR CATCHING ANIMALS.

Specification of Letters Patent No. 3,326, dated November 6, 1843.

*To all whom it may concern:*

Be it known that we, JACOB STROOP and JOHN ESTEALE, of the city of Allegheny, in the county of Allegheny and State of Pennsylvania, have invented a new and useful Improvement in Box-Trap Machines for the Trapping of Animals, called the "Notator Trap;" and we do hereby declare, that the following is a full, clear, and exact description of the same and of the construction and operation thereof, reference being had to the annexed drawing, making a part of this specification, in which—

Figure 1, is a perspective view; Fig. 2, is a longitudinal view with the top open, showing the interior thereof from the top; Fig. 3, is also a longitudinal view and elevation, with an open side, showing the interior from the side; Fig. 4, is a perspective view of the ratchet and clock hands, which is placed at the lower end of the turnstile shaft; Fig. 5, is a side or edge view of the treadle.

The form of the box is to be made of greater length than width, and to have greater width than height, though this form may be varied as necessity may require in some instances.

A, is an upright shaft (this shaft may be laid in a horizontal position making the other parts of the machine to correspond) with a pivot in the center of each end, and resting on the point of the lower pivot, in a step that is placed on the bottom board; where it revolves. The upper pivot extends through the top board, and is kept to place by the top board, and extends sufficiently above the board to receive the spool B.

C, C, C, are a number of bars that is placed at equal distances apart around the shaft in several horizontal lines, and to be kept in straight lines lengthwise of the shaft, as may be seen by reference to Figs. 2, and 3, the bars to be all of an equal length, and to be firmly drove, with one end into the shaft, so as to project at right angle from the shaft; at or near the outer end of those bars there may be a small sharp point on the front side, and in some cases those points may be placed nearer to the shaft, and for some animals it is not necessary that there be any, (this to be left to the judgment of the trapper). This part of the machine is called the turnstile. The use and character of this part of the machine, is, that, when the animal enters the machine or trap and springs the treadle, the turnstile then revolves and the bars, C, C, C, press forward against the animal and cause it to pass into the cage apartment.

B, is a spool that is connected to the upper end of the pivot, in the top end of the shaft, and there made fast, being on the top and outside of the trap, see Fig. 1.

D, is a circular ratchet, set on the bottom board at the lower end of the turnstile shaft and there made fast; E, E, are two click hands that is attached to the lower end of the shaft, by a pin that passes through the eye of the hands and driven into the shaft. Those hands play freely on the pins and drag over the ratchet, and is made somewhat similar to those of a boat or ship capstan; so as to prevent the animal from forcing the turnstile back.

H, is a set of bars that is placed firmly with one end in the back board or post on the opposite side of the trap from the entrance into the trap at 6, and to be set in a straight perpendicular line, and regular spaces, and so set, that the revolving bars of the turnstile can pass between them, as shown in Figs. 2, and 3; the other end of the bars projecting toward the shaft leaving room for the shaft to turn without touching; this is to form a barrier to prevent the animal from escaping, and placing it in front of the avenue, that leads into the cage room.

I, is a treadle, that is placed in the interior, and lays flatwise, near the bottom board, and immediately between the entrance, 6, and the feed room; this treadle is supported near its center by two pivots, one at each edge; resting on blocks or pins with an eye in to receive the pivots, and made fast to the bottom board; the treadle is to be kept a little up from the bottom board so as to have room to vibrate. The outer end is made heaviest, so that the inner end will always be up, when there is no pressure upon it. At the inner end or point of this treadle there is a projection that rises about square up, forming a hook, so that the lower range of bars, of the turnstile, will come in contact with the hook and check the turnstile, and hold it in check until the treadle is again pressed upon so as to sink the hook and free the bar, see Fig. 5. 0, the bar; 7, the hook.

J, is a number of bars extending from the bottom to the top boards, in which they are made fast, and ranged in a curvature form, forming the front of the feed room; and so arranged that the turnstile can revolve within the curve; 8, is a set of bars placed in a straight line and fastened in the top and bottom as the circular ones forming a partition between the cage room and feed room; (this partition may be made close, and form the division between the feed room, and the avenue to the cage room).

X, is a close partition, extending from the bottom to the top boards; K, is the feed or bait room; (this room is to be in some cases sufficiently large to admit an animal in, as a decoyer, and in that case, to be divided into two apartments, the one to contain the decoyer, and the other the feed, the feed room to adjoin the avenue, both fronting toward the turnstile).

L, is a door to put in the decoyer or bait. This door may be placed in the side or where most convenient.

M, is a door at the side of the cage room, to take the animal out at.

N, is a gate, that is in the avenue leading from the trap to the cage room, and is swung on two pivots at the upper end, and when shut it stands in an incline position, the lower end resting on the bottom board and so set that when the animal enters, that it can raise the gate and pass under it into the cage room; when the gate will by its weight fall back and close the avenue. The gate is made of bars, that the animal may see through, and to be light enough that there may be no difficulty to raise it; (in some cases it is necessary that there be two of those gates in this avenue, made, and swung similar to each other, having but a small space between them so that they do not interfere with each other; this is necessary to overcome the cunning of some animals).

P, is a partition on the inner side of the avenue; Q, is the cage room; this in some cases, may be an open yard or pen.

R, is a set of bars that close the end of the cage; S, is an upright post on the top and tail end of the trap, with a mortise in the upper end, and pin hole crossings through the mortise; T, is a pulley that is placed in the mortise in the post, supported and kept to place by a pin passing through its center, on which it revolves; U, is a cord, with one end attached to the spool, and to the other end, a weight, this cord passes over the pulley; V, is a weight that gives action to the turnstile; W, is an upright, extending from bottom to top, and forms one side of the entrance, 6, in this upright. There is an equal number of bars with H, and on the same range; those are short and set, so as to leave sufficient room for the animal to pass into the trap, between their inner ends, and the shaft, the inner ends of those bars may be drawn to a point.

2, 2, 2, are the outer walls of the trap.

3, is the bottom board.

4 is the top board or covering.

The settings and operation of this machine is thus: Wrap the cord on the spool so as to bring up the weight near the head so as to give action to the turnstile in the pulley, and give action to the turnstile in the proper direction, the animal to allure and bait is put into the trap or room for that purpose; the trap is then set and in readiness. The animal enters at the opening, 6, and when it bears on the inner end of the treadle and sinks the hook so as to free the turnstile, the weight will cause it to revolve, and act against the animal, and press it off the treadle, to the entrance into the cage room; the treadle will then rise, and the next set of bars in the turnstile will come in contact with the hook and check, and remain in check for the next.

What we claim as our invention and desire to secure by Letters Patent is—

1. The turnstile operated substantially as herein described, in combination with the sets of bars H, and also with the sets of bars W, as described.

2. We further claim the turnstile in combination with the treadle, and also with the box trap, for the purpose and in the manner described.

JACOB STROOP.
JOHN ESTEALE.

Witnesses:
WM. COOK,
H. N. WRIGBY.